（12）United States Patent
Asulin et al.

(10) Patent No.: US 10,467,394 B2
(45) Date of Patent: Nov. 5, 2019

(54) POINTING DEVICE BIOMETRICS FOR CONTINUOUS USER AUTHENTICATION

(71) Applicant: International Business Machines Corporation, Armonk, NY (US)

(72) Inventors: David Asulin, Beer Sheva (IL); Oded Margalit, Haifa (IL); Ron Peleg, Kfar Bilu (IL); Shmulik Regev, Haifa (IL); Alexandra Shulman-Peleg, Givataim (IL)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 15/206,333

(22) Filed: Jul. 11, 2016

(65) Prior Publication Data

US 2018/0012003 A1 Jan. 11, 2018

(51) Int. Cl.
  *G06F 7/04* (2006.01)
  *G06F 21/31* (2013.01)
  *G06F 21/32* (2013.01)
  *G06F 21/36* (2013.01)

(52) U.S. Cl.
  CPC ............ *G06F 21/316* (2013.01); *G06F 21/32* (2013.01); *G06F 21/36* (2013.01)

(58) Field of Classification Search
  CPC ......... G06F 21/316; G06F 21/32; G06F 21/36
  See application file for complete search history.

(56) References Cited

U.S. PATENT DOCUMENTS

| 8,161,530 B2 | 4/2012 | Meehan et al. |
| 8,452,978 B2 * | 5/2013 | Alward ................ G06F 21/316 713/185 |
| 8,843,754 B2 | 9/2014 | Alward et al. |

(Continued)

FOREIGN PATENT DOCUMENTS

EP  2490149  8/2012

OTHER PUBLICATIONS

Mirko Stanić., "Continuous User Verification Using Mouse Dynamics", Information Technology Interfaces (ITI), Proceedings of the ITI 2013 35th International Conference on, Date of Conference: Jun. 24-27, 2013, pp. 251-256.

(Continued)

*Primary Examiner* — Samson B Lemma
(74) *Attorney, Agent, or Firm* — Dvir Gassner

(57) ABSTRACT

There is provided, in accordance with some embodiments, a method comprising using one or more hardware processors for receiving a behavioral biometric model that characterizes a human user according to pointing device data of the human user, where the pointing device data comprises screen coordinate and time stamp pairs. The method comprises an action of monitoring an input data stream from a pointing device in real time, wherein the input data stream covers two or more spatial regions of a display screen, and an action of segregating the input data stream into one or more subset streams that is restricted to one of the plurality of spatial regions. The method comprises an action of computing a similarity score based on one or more comparisons of the behavioral biometric model and the one or more subset streams, and an action of sending the similarity score to a user authorization system.

27 Claims, 4 Drawing Sheets

(56) References Cited

U.S. PATENT DOCUMENTS

2012/0054057 A1 3/2012 O'Connell et al.
2014/0317726 A1 10/2014 Turgeman et al.

OTHER PUBLICATIONS

Prasanna Y. Kumawat., "Continuous User identity Verification via Mouse Gesture Dynamics", International Journal of Innovations & Advancement in Computer Science, IJIACS, ISSN 2347-8616, vol. 3, Issue 9, Nov. 2014.

Prof. A. A. Muzumdar et al., "Authentication of User via Keyboard and Mouse Dynamics", IJARIIE-ISSN(O)—2395-4396, vol. 1 Issue-4 2015.

Nan Zheng et al., "An efficient user verification system via mouse movements", CCS '11 Proceedings of the 18th ACM conference on Computer and communications security, pp. 139-150, 2011.

\* cited by examiner

POINTING DEVICE BIOMETRICS FOR CONTINUOUS USER AUTHENTICATION

BACKGROUND

The invention relates to the field of access control, and more specifically user authentication for access control.

Many digital applications, systems, and/or devices use a form of user authentication for access control, such as to prevent unauthorized access to information, resources, services, and the like. For example, logon credentials, such as a username and password combination, are a form of user authentication for access control. Other examples, are passcodes, biometrics, facial recognition, and the like. In general, classical user authentication may be categorized as something a user has, something a user knows, and/or something a user is. Behavioral biometrics, also referred to as behaviometrics, further the concepts of user authentication to something a user does, and/or how they do it.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with some embodiments, a method comprising using one or more hardware processors for receiving a behavioral biometric model that characterizes a human user according to pointing device data of the human user, where the pointing device data comprises screen coordinate and time stamp pairs. The method comprises using hardware processor(s) for monitoring an input data stream from a pointing device in real time, wherein the input data stream covers two or more spatial regions of a display screen. The method comprises using hardware processor(s) for segregating the input data stream into one or more subset streams that is restricted to one of the plurality of spatial regions. The method comprises using hardware processor(s) for computing a similarity score based on one or more comparisons of the behavioral biometric model and the one or more subset streams. The method comprises using hardware processor(s) for sending the similarity score to a user authorization system.

There is further provided, in accordance with some embodiments, a behaviometric computer program product comprising a non-transitory computer-readable storage medium having program code embodied therewith. The program code is executable by one or more hardware processors for receiving a behavioral biometric model that characterizes a human user according to pointing device data of the human user, wherein the pointing device data comprises screen coordinate and time stamp pairs. The program code is executable by one or more hardware processors for monitoring an input data stream from a pointing device in real time, wherein the input data stream covers two or more spatial regions of a display screen. The program code is executable by one or more hardware processors for segregating the input data stream into one or more subset streams that is restricted to one of the plurality of spatial regions. The program code is executable by one or more hardware processor for computing a similarity score based on one or more comparisons of the behavioral biometric model and the one or more subset streams. The program code is executable by one or more hardware processors for sending the similarity score to a user authorization system.

There is further provided, in accordance with some embodiments, a computerized system comprising one or more hardware processor, a user interface comprising a display screen and a pointing device, and a non-transitory computer-readable storage medium having program code embodied therewith. The program code is executable by one or more hardware processor for receiving a behavioral biometric model that characterizes a human user according to pointing device data of the human user, wherein the pointing device data comprises screen coordinate and time stamp pairs. The program code is executable by one or more hardware processor for monitoring an input data stream from a pointing device in real time, wherein the input data stream covers two or more spatial regions of a display screen. The program code is executable by one or more hardware processor for segregating the input data stream into one or more subset stream that is restricted to one of the plurality of spatial regions. The program code is executable by one or more hardware processor for computing a similarity score based on one or more comparison of the behavioral biometric model and the one or more subset stream. The program code is executable by one or more hardware processor for sending the similarity score to a user authorization system.

In some embodiments, the method further comprises the step of monitoring a training data stream from a pointing device of a user interface, wherein the pointing device is operated by an authorized user, and wherein the training data stream covers the plurality of spatial regions of the display screen.

In some embodiments, the method further comprises the step of computing the plurality of spatial regions using spatial cluster analysis of the screen coordinates of the training data stream In some embodiments, the method further comprises the step of segregating the training data stream into one or more subset training streams, each restricted to one of the plurality of spatial regions.

In some embodiments, the method further comprises the step of computing the behavioral biometric model from the one or more subset training streams.

In some embodiments, the behavioral biometric model is one or more models from the group consisting of a path model and a pattern model, wherein the path model is a statistical model of pointing device motions between the plurality of spatial regions, and wherein the pattern model is a statistical model of pointing device motions within the plurality of spatial regions.

In some embodiments, the pointing device data further comprises one or more from the group consisting of a mouse button transition a mouse button state, a combined keyboard and mouse button state, and a difference in timestamp values greater than a threshold.

In some embodiments, the method further comprises one or more actions from the group consisting of sending a notification, activating an alarm, and sending a login request.

In some embodiments, the method further comprises the action of computing a confidence score based on a statistical power of the similarity score and the comparison of the behavioral biometric model and the one or more subset streams.

In some embodiments, the similarity score is computed from two or more comparisons of the behavioral biometric model and two or more subset streams, thereby providing an aggregate similarity score.

In some embodiments, the behaviometric computer program product further comprises the step of monitoring a training data stream from a pointing device of a user interface, wherein the pointing device is operated by an authorized user, and wherein the training data stream covers the plurality of spatial regions of the display screen.

In some embodiments, the behaviometric computer program product further comprises the step of computing the plurality of spatial regions using spatial cluster analysis of the screen coordinates of the training data stream.

In some embodiments, the behaviometric computer program product further comprises the step of segregating the training data stream into one or more subset training streams, each restricted to one of the plurality of spatial regions. In some embodiments, the behaviometric computer program product further comprises the step of computing the behavioral biometric model from the one or more subset training streams.

In some embodiments, the behaviometric computer program product further comprises one or more actions from the group consisting of sending a notification, activating an alarm, and sending a login request.

In some embodiments, the behaviometric computer program product further comprises the action of computing a confidence score based on a statistical power of the similarity score and the comparison of the behavioral biometric model and the one or more subset streams.

In some embodiments, the similarity score is computed from two or more comparisons of the behavioral biometric model and two or more subset streams, thereby providing an aggregate similarity score.

In some embodiments, the computerized system further comprises the step of monitoring a training data stream from a pointing device of a user interface, wherein the pointing device is operated by an authorized user, and wherein the training data stream covers the plurality of spatial regions of the display screen.

In some embodiments, the computerized system further comprises the step of computing the plurality of spatial regions using spatial cluster analysis of the screen coordinates of the training data stream. In some embodiments, the computerized system further comprises the step of segregating the training data stream into one or more subset training stream, each restricted to one of the plurality of spatial regions.

In some embodiments, the computerized system further comprises the step of computing the behavioral biometric model from the one or more subset training stream.

In some embodiments, the behavioral biometric model is one or more model from the group consisting of a path model and a pattern model, wherein the path model is a statistical model of pointing device motions between the plurality of spatial regions, and wherein the pattern model is a statistical model of pointing device motions within the plurality of spatial regions.

In some embodiments, the pointing device data further comprises one or more from the group consisting of a mouse button transition a mouse button state, a combined keyboard and mouse button state, and a difference in timestamp values greater than a threshold.

In some embodiments, the computerized system further comprises one or more action from the group consisting of sending a notification, activating an alarm, and sending a login request.

In some embodiments, the computerized system further comprises the action of computing a confidence score based on a statistical power of the similarity score and the comparison of the behavioral biometric model and the one or more subset stream.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
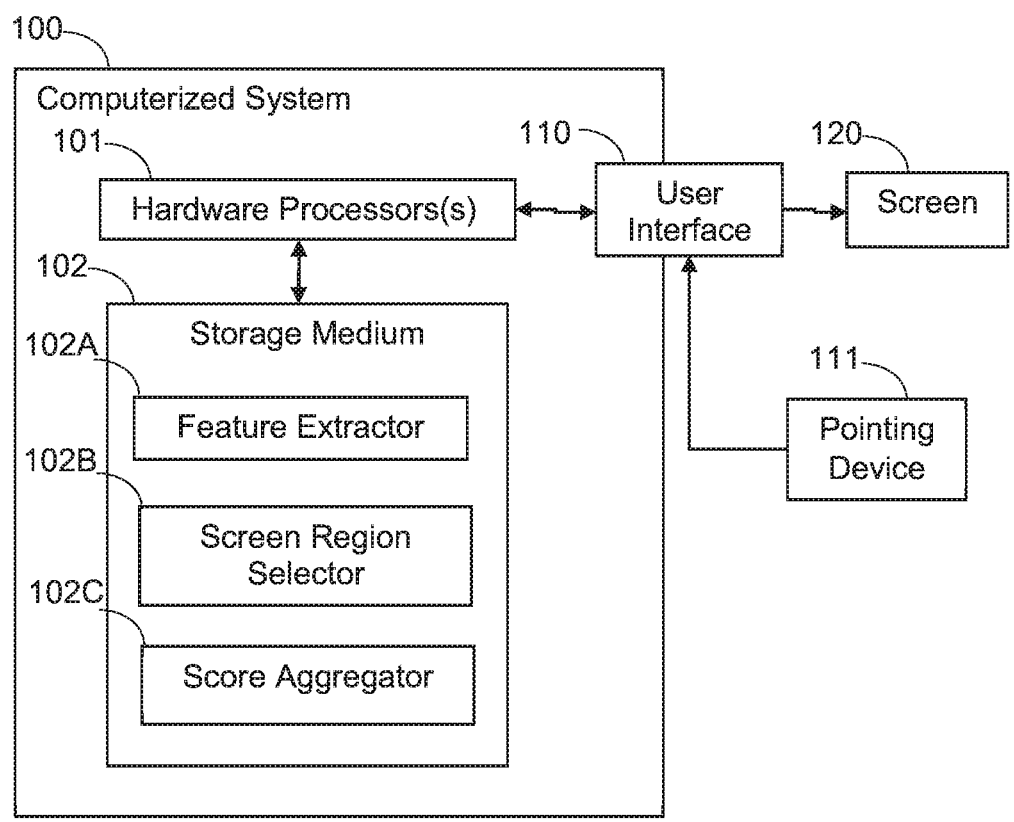
FIG. 1 shows a schematic illustration of a system for spatial segmentation of behaviometric pointing device data.

Disclosed herein are systems, methods, and computer program products for user authentication using behavioral biometrics of a computer pointing device, such as pointing device behaviometrics.

A computer system, method, and/or the like, may collect data generated by a pointing device from a particular user during an enrollment or training session, and use the data to generate one or more models that identify the particular user using a particular application on the computer. For example, the pointing device may be a mouse, a touch screen, a stylus, a trackball, and/or the like, and the data may be screen coordinates, timestamps, button status, and/or the like. According to embodiments of the present disclosure, the pointing device data may be spatially clustered into screen regions to automatically identify screen regions related to input fields, user interaction fields, user significant fields, and/or the like. Within each screen region, patterns specific to a user are statistically modelled during the training session, such as using machine learning or the like. The pointing device motion between each screen region may be separately modelled during the training session to determine path models for the user between the regions. Some of these specific patterns and regions may be unique to each user and application, and provide the basis for the statistical model used in a later verification session.

Computing a statistical model may use features extracted from the pointing device data, such as by position and velocity calculations, a machine learning analysis, a neural network analysis, and/or the like. Many different methods of feature extraction are disclosed in the literature or may be developed in the future, and the techniques described herein for automatic region selection may be applied in addition to the specific choice of features to extract or methods to determine the statistical model. For example, different methods for pointing device behaviometrics are discussed by Jorgensen et al. in "On Mouse Dynamics as a Behavioral Biometric for Authentication" published in Proceedings of the 6th ACM Symposium on Information, Computer and Communications Security, Pages 476-482, Association for Computing Machines, New York, which is incorporated herein by reference in its entirety. Pointing device behaviometrics for use in user authentication may be applied as a static authentication, such as during an initial logon for access to a computerized system, or as a continuous authentication, such as to prevent a "lunch time" imposter from accessing a secure system.

During the verification session, new pointing device data is collected, features extracted, and compared to the model to authenticate the user. The new pointing device data is segregated into the screen regions according to one or more models, and the new pointing device data compared to the statistical models of each screen region and for the path models between the regions. Each comparison may generate a similarity score and/or a confidence score, and the similarity and/or confidence scores are aggregated for multiple regions and pointing device motion between regions. As the comparisons are performed over time, as more pointing device data is collected and received, the scores may be combined, such as aggregated, to continuously monitor the user authentication. The aggregation continues until the similarity score is below a threshold, indicating that the new pointing device data is not following the user patterns, and the confidence score is above a threshold indicating that similarity score is accurate.

An aggregate score may be used to determine whether the user is legitimate and/or authorized, and may be calculated by combining the similarity and/or confidence scores from the analysis individual screen regions, such as clusters, optionally with scores of user interaction for path models created travelling between screen regions. Optionally, the scores are weighted by the cluster quality, importance, the significance of the considered feature in the model, the accuracy of the model, and/or the like.

For example, starting at a certain time point, the new pointing device data indicates no similarity to the authorized user model in a specific screen region of entering a medical test result, and the confidence score starts at a low value, but as time goes on and the similarity score is still low the confidence score increases until there is a high confidence score that indicates the low similarity score truly reflects that the user is not the authorized user. The similarity and confidence scores are used to reduce the statistical type I and type II errors. For example, in biometric matching the probability of type I errors may be called the "false reject rate" (FRR) or false non-match rate (FNMR), while the probability of type II errors may be called the "false accept rate" (FAR) or false match rate (FMR). In this way, when an authorized user makes a temporary change to the pointing device motions there may be some time before the authorized user is rejected by the security system. The similarity score may be analogously compared to a correlation statistic and the confidence score may be analogously compared to a p-value statistic.

Optionally, the similarity and/or confidence scores are computed for a temporal subset of the new point device data. For example, the similarity and/or confidence scores are computed from the new data during a time window, during a moving time window, at discrete time windows, at overlapping time windows, and/or the like.

When more than one user has access to a system, such as two people sharing a joint bank account, when one person uses different types of systems to access a single account, and/or the like, multiple models may be used to allow multiple confidence scores to be computed and combined into a single composite score for all users and/or systems.

A pointing device may be a computer mouse, a touch pad, a track pad, a track ball, a finger, a stylus, and/or the like. In some cases, the display has sensor elements that interact physically with the pointing device, such as a touchscreen, or the like.

When a pointing device moves between identified screen regions, paths particular to a user are recorded and statistically modeled. Once the pattern and/or path models are determined based on the screen regions, the pointing device motions are monitored and compared with the models to compute the similarity and/or confidence scores that the user is operating the pointing device. When the similarity score is below a similarity threshold and/or confidence scores is above a confidence threshold, a security threat may be issued, such as an alert to the system, a notification sent, the user locked out of the system, and/or the like.

The problem of identity theft and fraud may be relevant to many types of applications, such as cyber security, medical systems, online finance, e-commerce, enterprise information systems, and/or the like. This method is susceptible to imposters that may have acquired the user's credentials and are using the account for fraudulent activity and/or to gain access to restricted resources. The exact nature of the pointing device data that is gathered by the system may be unknown to the user, making it much more difficult for an imposter to successfully violate the system for a long period of time.

Many current methods for user identification and verification based on pointing device movements extract a certain set of features from the data and then train classifiers to recognize the different users. New data may be classified using these classifiers in order to identify the specific user or to verify his identity. Most current methods differ in the feature-set they use and in the learning method utilized. Many of the current methods suffer from major drawbacks, including:

Very long learning and/or verification times,
Task specificity—requiring the user to repeat the same operation, or relying on a tightly controlled environment,
Poor ability to scale to large numbers of different users while maintaining acceptable error levels, and
Sensitivity to behavioral variability caused by different legitimate users of the same account, different input devices, natural changes in user behavior over time, and the like.

Using spatial clustering to automatically separate the training data into screen regions, and analyzing the features in each region separately, may solve these issues, such as reduce the amount of data needed to train and test the user model, analyze and reduce variability, dynamically adapt to different system layouts and user interaction, verify a large number of users while maintaining good prediction performance, and/or the like.

Figure 2:
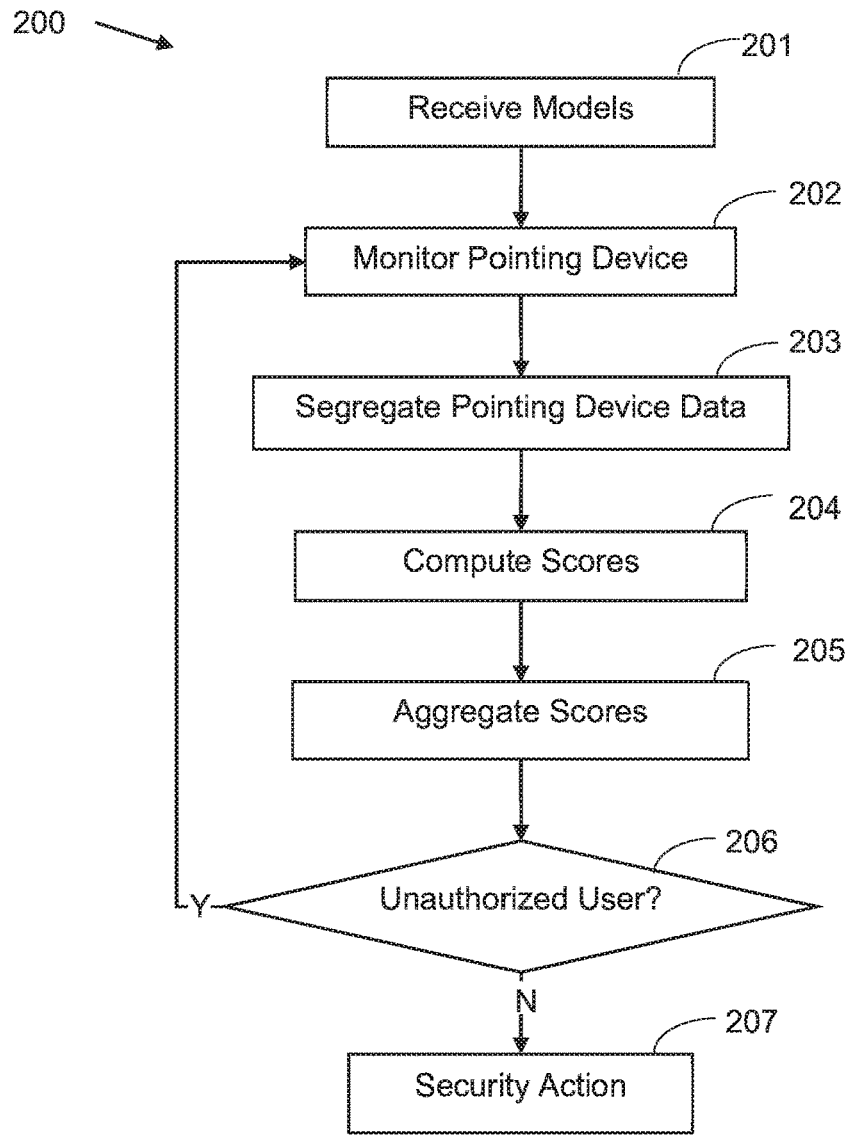
FIG. 2 shows flowcharts of methods for spatial segmentation of behaviometric pointing device data.
Figure 2:
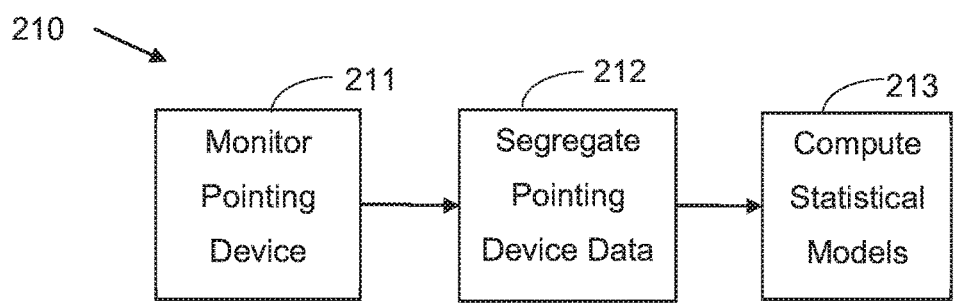

Reference is now made to FIG. 1 and FIG. 2, which show a schematic illustration of a system 100 and flowcharts 200 and 210, respectively, for spatial segmentation of behaviometric pointing device data. Computerized system 100 comprises one or more hardware processors 101, a user interface 110, and a storage medium 102, such as a non-transitory computer readable storage medium. User interface 110 comprises a screen 120 for presenting electronic forms to a user and a pointing device 111 for receiving user pointer movements and selections on screen 120. Storage medium 102 comprises program code embodied therewith, such as embodied in modules, the program code executable by hardware processor(s) 101.

For example, the program code is embodied in a Feature Extractor 102A, a Screen Region Selector 102B and a Score Aggregator 102C. Screen Region Selector 102B may comprise instruction that when executed on hardware processor(s) 101 cause hardware processor(s) 101 to receive pointing device 111 raw data, such as monitoring 202 and 211 pointing device 111 data. For brevity, the modules may be described in active voice as performing the method actions, while it is known that the instructions are executed by the hardware processor(s) 101. Screen Region Selector 102B may segregate 203 and 212 temporal and/or spatial subsets of the monitored pointing device 111 data. For example, Screen Region Selector 102B extracts a temporal subset based on a fixed time window, optionally with window overlap. For example, Screen Region Selector 102B extracts a temporal subset based on a fixed number of pointing device strokes, optionally with overlap. For example, Screen Region Selector 102B extracts a temporal subset based on a fixed number of pointing device strokes, optionally with overlap. For example, Screen Region Selector 102B a subset of pointing device data from a small screen region, such as an input field screen region, a button screen region, and/or the like.

Feature Extractor 102A computes 204 and 213 features of the pointing device 111 data, statistical models of the features, and scores between models and new pointing 111 device data. For example, a machine learning technique is used to extract features and compute statistical models. For example, a support vector machine (SVM) technique is used to extract features and compute statistical models. For example, a neural network technique is used to extract features and compute statistical models. Computed 204 scores may comprise a similarity score, a confidence score, and the like.

Score Aggregator 102C aggregates multiple scores 205 into a running score for both similarity and confidence, and periodically checks the scores against thresholds for each score to check 206 if an unauthorized user is operating the pointing device 111. For example, if the similarity score is below a similarity threshold, such as a value of 0.5, a security action 207 is initiated. For example, if the confidence score is above a confidence threshold, such as a value of 0.8, a security action 207 is initiated. For example, security action 207 is a notification to a security system, presenting a request for user authentication, system lockout, sounding an alarm, and/or the like. For example, different thresholds may be used depending on the sensitivity of the software system. For example, a financial system may require a very low similarity and/or confidence threshold. For example, a user feedback and/or survey system may use a very high similarity and/or confidence threshold.

Pointing device data may be monitored during one or more user's interaction with a screen of a software system. For example, the data may be screen coordinates of the pointer (e.g. mouse cursor or another pointing device), a timestamp (indicating when the pointing device was in that location), pointing device button status, pointing device button status change, a finger pressure, and/or the like.

The pointing device data may be segregated into movement strokes, which are defined as consecutive data points which terminate either with a button change or a period of device inactivity.

Data may be segregated into subsets, such as subsets of a fixed number of data points, subsets of a certain time window, subsets of a certain number of strokes, and/or the like. The subsets may be selected with overlap between the subsets. For example, when a user makes 40 strokes in one session, the group size is 20 and the overlap is 10 moves, this session would result in 3 groups: moves 1-20, moves 11-30, moves 21-40. The system may capture characteristic movement blocks of the user and thereby continuously test the user behavior in real-time during the session.

In order to reduce the verification time considerably, a continuous similarity and/or confidence score calculation technique may be implemented, such as in overlapping time windows. For example, when an overlap of 80% is used, the verification time may be reduced up to 5-fold. The continuous similarity and/or confidence score calculation may create a short-term memory effect which may prevent accidental false-positives while still allowing fast detection of behavioral changes.

Screen regions of user activity are automatically recognized and may be used to generate separate clusters of 2D movements in space (traces) and 3D movements in space and time (interactions). This step results in a segmentation of the screen to regions of user interaction and transit between them. The user's behavior may be analyzed separately in each of the screen regions to build one or more unique models for each region (pattern models) and for the paths between regions (path models).

The user interaction with the software system varies between different parts of the system (both different screens/pages and different parts of the screen/page). Spatial clustering of the pointer coordinates and/or movements into screen regions of interest for modelling, such as hot spots of user activity, input field locations, screen regions the user "parks" the pointer, and/or the like. These screen regions may have unique meaning for each application and, thus, the user's behavior may be analyzed separately in each of the screen regions. This also enables analysis of the movements between the different screen regions as discussed herein. The calculated probability of whether the user is legitimate and/or authorized is achieved by combining the similarity and/or confidence scores from the analysis of individual clusters (possibly weighted by the cluster quality) with similarity and/or confidence scores of user interaction when travelling between screen regions.

For example, one embodiment for automatically extracting spatial clusters and transition areas is by using multi-scale two-dimensional accumulator matrices. In this example, each interaction point "votes" for cells in the matrices that contain it. For example, the plane is iteratively divided to cells, such that in the i-th iteration, the grid contains $2^i \times 2^i$ cells. Optionally, the voting of each interaction point is weighted using several parameters, such as the speed of movement through the point, pressure, and/or other like characteristics. After the voting process, the accumulator matrices may be segmented—adjacent regions with high scores correspond to spatial clusters while regions with low scores are paths between spatial clusters. The multi-scale voting embodiment allows for automatic detection of screen regions with different sizes.

Optionally, spatial clusters and transition areas are automatically extracted using a model-based agglomerative hierarchical clustering method. In addition, this method may also include a trimming step of spurious clusters (representing transition areas).

For example, in some embodiments, a mixture of density functions is fitted to the data using Maximum Likelihood estimation to find the optimal number of clusters G, where the likelihood function is: $L_{mix} = \Pi_{i=1}^n \Sigma_{k=1}^G \tau_k f_k(y_i|\theta_k)$. $f_k$, $\theta_k$ denote the density and parameters of the kth-component in the mixture and $\tau_k$ is the probability that a data point belongs to the kth component. A good choice for the density function may be the multivariate normal distribution.

An initial classification for each potential value of G may be found by performing hierarchical agglomeration that approximately maximizes the classification likelihood: $L_{CL} = \Pi_{i=1}^n f_{l_i}|\theta_{l_i})$, where $l_i$ denotes labels indicating the unique classification of each observation (instead of probability in $L_{mix}$). This alternative starts with each data point in a singleton cluster and successively merges pairs of clusters that maximize the increase in classification likelihood, until only G clusters are left.

The joint estimation and maximization of said likelihood function $L_{mix}$, for each selection of G may be computed using an Expectation-Maximization (EM) algorithm, possibly using the initial classification result from the aforementioned hierarchical agglomeration. The optimal clustering result may be determined by several selection methods such as maximizing the Bayes Information Criterion (BIC).

The additional trimming step may ignore the data points which are least likely to fit to any of the resulting mixture components, and these areas may be classified as transitional.

Optionally, a background model is created by taking a large sample of movement blocks from the entire population of users and using spatial clustering methods in order to generate the common representative behaviors of all the users, and characterize each user relative to the background model. This may allow the statistical model generated to achieve better separation between the user and the population.

Given a sufficient amount of such pointing device data from a single user, a statistical model representing the user's behavior is built using this data, possibly relative to a background model. This may involve the user-specific feature-set learning, and the exact amount of data needed may be decided based on performance measurements of the method.

The use of screen regions determined automatically from pointing device data spatial clustering may assist in improving any existing or future statistical model.

The pointing device data of each user may be described by a different set of features which are most characteristic to that specific user. For example, a fuzzy, multi-feature statistical model of pointing device data is constructed separately for each user in a hold-one-out manner. For example, one user may be described by long consecutive pointing device strokes with high curvature while a different user might be identified by slow strokes with long silence times. These data may be identified by combining the base features of each user into high-level descriptors which best separate this user from others and may be used to perform authentication and/or identification.

Each user may have a different subset of the entire feature space which is more specific for their identification using pointing device strokes. The features which best separate the pointing device activities of a user from the general population may be selected this way and features discarded which do not add to the separation ability.

Optionally, a hold-one-out method, where each feature is removed from the data and the performance difference between the complete model and the model evaluated without this feature, indicates the marginal importance of that feature to the user's model. For example, features with least importance are discarded from this user's model.

Optionally, basic features may be combined into higher-level sets of features, or descriptors. The descriptors may be chosen randomly for each user model, from the features-set selected for that user. Each descriptor may be used in a statistical model and the response from all of the independent descriptor models is combined to generate the overall system response to new data.

For each subset of pointer data, different measures, metrics, and/or features may be calculated, such as measuring the movements speed, acceleration, distance, angles and curvatures, click times, silence periods, and the like.

As mentioned above, an aggregate score may be used to determine whether the user is legitimate and/or authorized, and may be calculated by combining the similarity and/or confidence scores from the analysis individual screen regions, such as clusters, optionally with scores of user interaction for path models created travelling between screen regions. Optionally, the scores are weighted by the cluster quality, importance, the significance of the considered feature in the model, the accuracy of the model, and/or the like.

For example, the similarity score between the observed user interactions with those recorded in the database may be calculated by the following formula: Similarity-Score (observed-trace, stored-trace)=Sum-features [W–feature* (Sum–all–I [W–cluster–i*Similarity–cluster–i]+Sum–all–ij [Similarity–path–ij])].

Figure 3:
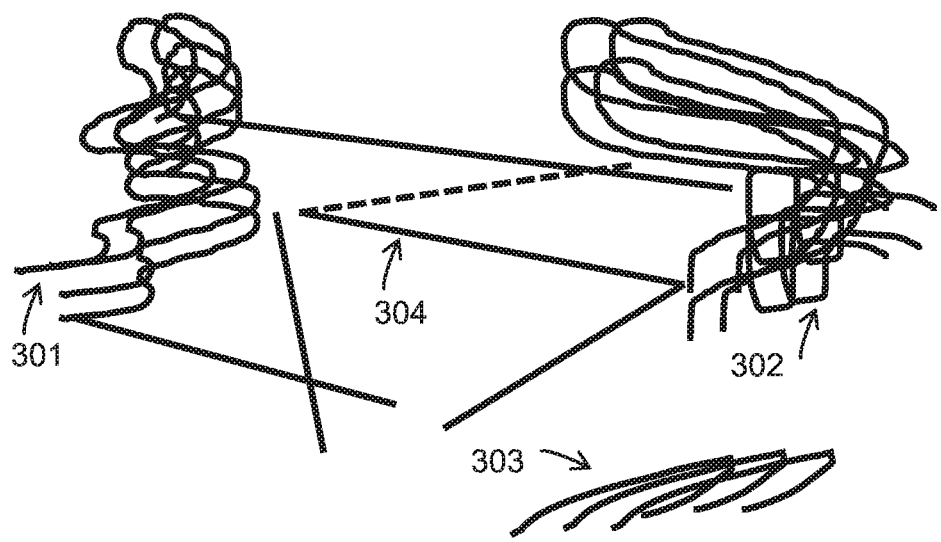
FIG. 3 shows a schematic illustration of spatial segmentation of pointing device data.

Reference is now made to FIG. 3, which shows a schematic illustration of spatial segmentation of pointing device data. For example, transitions 304 between screen regions 301, 302, and 303 are not modelled as just another screen region cluster. For example, significant clusters may be modeled as at 301, 302 and 303, and transitions 304 to those and other clusters may be modelled by path models to calculate the aggregated similarity and/or confidence scores.

Figure 4:
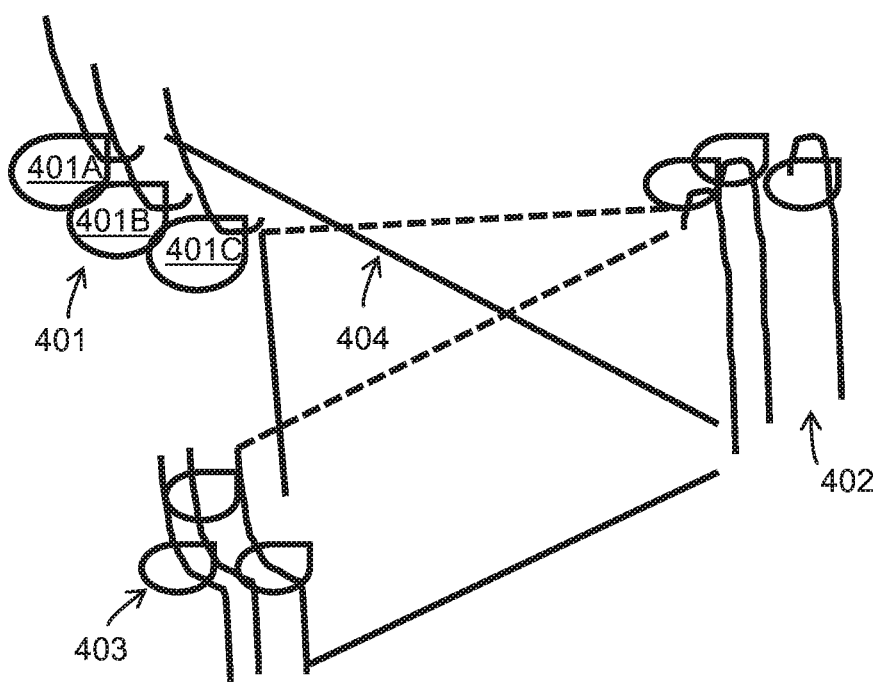
FIG. 4 shows a schematic illustration of spatial segmentation of pointing device and pressure data.

Reference is now made to FIG. 4 shows a schematic illustration of spatial segmentation of pointing device and pressure data. The pressure data 401A, 401B and 401C may be further modelled in addition to clusters 401, 402, and 403. Optionally, path data 404 is modelled.

Since several legitimate users may be using an application with the same credentials, a behavior variability technique may determine the number of legitimate users based on the analysis of multiple models from multiple users.

Given a set of pointing device data originating from the same application training session, an embodiment may automatically calculate whether a single model may be built for this user or multiple models. Multiple models may be required when more than one pattern is detected within the same spatial region. For example, a husband and wife using the same bank account, a user who accesses the account from two computers with differing hardware configuration and input devices, and the like.

Spatial, temporal, or feature cluster analysis may be used to split the user data to different clusters of similar pointing device behavior. These clusters may be spatially analyzed by judging the intra-distances of each cluster and the inter-distances between clusters. When there are compact screen region clusters that are far apart, the data set may be sub-divided to create multiple models that capture each unique behavior of the user.

Figure 5:
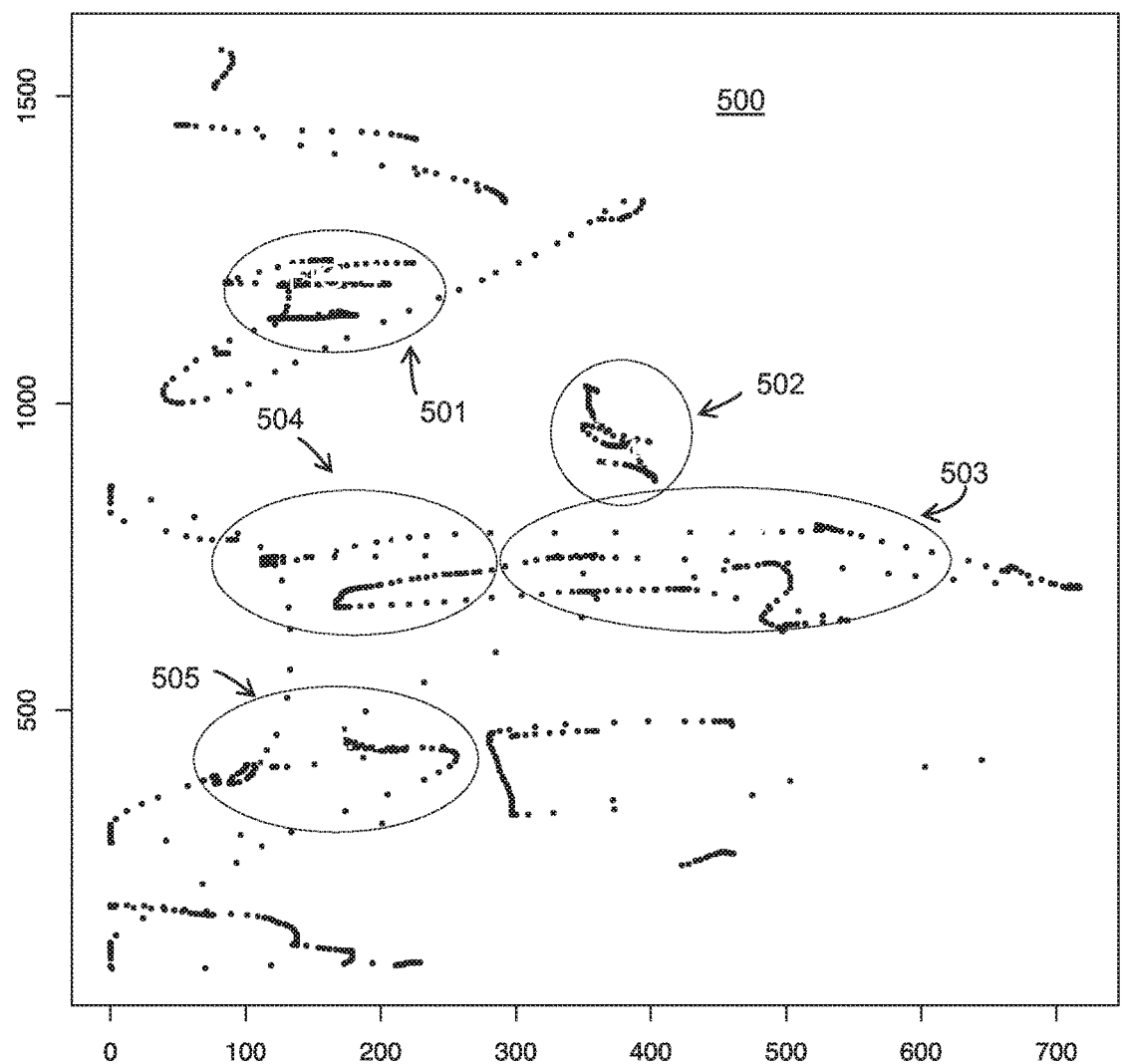
FIG. 5 shows a schematic illustration of segmented pointing device data on a display.

Reference is now made to FIG. 5, which shows a schematic illustration of segmented pointing device data on a display 500. Display 500 shows data points of the pointing device, and the clusters computed as at 501, 502, 503, 504 and 505. Data points between the clusters are the transition regions.

Methods may also be used to identify outliers in the training data, which may indicate fraudulent activity in the training phase of the enrollment process.

Optionally, a fraud detection system may use application level information regarding the registered number of users/owners, expected attributes, and/or the like, to refine the clustering of user pointing device data within the same account enrollment. For example, detection of new types of pointing device interactions may trigger contacting a higher level application. For example, detection of new features or sub-clusters of features may trigger contacting a higher level application. The higher level application may provide information assisting in classification of new activities as anomaly, fraud, benign, and the like.

New pointing device data collected from user sessions may sub-divided into temporal windows and tested against the models by grouping the data points to strokes, movements, and the like. The same model features may be extracted as in the learning phase and compared to the pattern and path models to determine the similarity and/or confidence scores. Overlapping windows may be used to continuously update the scores, with older scores optionally being removed from the aggregate scores. If the similarity score drops below a certain threshold, and optionally the confidence score increase above a threshold, the system may take measures against the user, such as disconnect the session, requesting additional identity information, block the user from accessing restricted data, blocking sensitive actions, and/or the like.

To address the problem of long verification time, the continuously calculated aggregate scores from overlapping time windows allow a quick detection of an unauthorized user, and this allows more test results per time unit. The aggregate scores may be updated with each new test result available, such as each new time window. Optionally, the time parameter may be added as a third dimension to allow on-line verification of the performed continuous interactions. In this case the interactions between the user and the pointing device are verified in a manner similar to chirography algorithms for on-line signature verification.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
   receiving a behavioral biometric model that characterizes a human user according to pointing device data of the human user, wherein the pointing device data comprises screen coordinate and time stamp pairs;
   monitoring an input data stream from a pointing device in real time, wherein the input data stream comprises screen coordinate and time stamp pairs and covers a plurality of spatial regions of a display screen;
   segregating the input data stream into at least one subset stream that is restricted to one of the plurality of spatial regions, wherein the segregating comprises:
      using multi-scale two-dimensional accumulator matrices to extract, from the input data stream: spatial clusters, and transition areas between the spatial clusters,
      having each screen coordinate in the input data stream vote for cells in each of the matrices, wherein the cells voted for are ones which contain the respective screen coordinate of the input data stream, and
      weighting the votes using at least one of the following parameters: speed of movement through the respective screen coordinate of the input data stream, and pressure applied by the human user to the respective screen coordinate of the input data stream;
   reducing a time needed for a user authorization system to verify an identity of the human user, and preventing accidental false-positive verification of the identity of the human user, by:
      segregating the at least one subset stream into further subsets of overlapping time windows, and
      computing a similarity score based on at least one comparison of the behavioral biometric model and each of the further subsets of overlapping time windows; and
   sending the similarity score to the user authorization system, to verify the identity of the human user.

2. The method according to claim 1, further comprising the steps of:
   monitoring a training data stream from a pointing device of a user interface, wherein the pointing device is operated by an authorized user, and wherein the training data stream covers the plurality of spatial regions of the display screen;
   computing the plurality of spatial regions using spatial cluster analysis of the screen coordinates of the training data stream;
   segregating the training data stream into at least one subset training stream, each restricted to one of the plurality of spatial regions; and
   computing the behavioral biometric model from the at least one subset training stream.

3. The method according to claim 1, wherein the behavioral biometric model is selected from the group consisting of a path model and a pattern model, wherein the path model is a statistical model of pointing device motions between the plurality of spatial regions, and wherein the pattern model is a statistical model of pointing device motions within the plurality of spatial regions.

4. The method according to claim 1, wherein the pointing device data further comprises at least one from the group consisting of a mouse button transition a mouse button state, a combined keyboard and mouse button state, and a difference in timestamp values greater than a threshold.

5. The method according to claim 1, further comprising at least one action from the group consisting of sending a notification, activating an alarm, and sending a login request.

6. The method according to claim 1, further comprising the action of computing a confidence score based on a statistical power of the similarity score and the comparison of the behavioral biometric model and the at least one subset stream.

7. The method according to claim 1, wherein the similarity score is computed from a plurality of comparisons of the behavioral biometric model and a plurality of subset streams, thereby providing an aggregate similarity score.

8. The method according to claim 1, wherein the segregating of the input data stream into at least one subset stream comprises:
finding an optimal number (G) of spatial clusters to extract from the input data stream, by fitting a mixture of density functions to the input data stream using maximum likelihood estimation.

9. The method according to claim 8, wherein the finding of G further comprises:
classifying each potential value of G by hierarchical agglomeration that approximately maximizes a classification likelihood, starting with each data point in a singleton cluster and successively merging pairs of spatial clusters that maximize an increase in classification likelihood, until only G clusters are left.

10. The method according to claim 9, further comprising estimating and maximizing the mixture of density functions by:
applying an Expectation-Maximization (EM) algorithm using an initial classification result from the hierarchical agglomeration.

11. The method according to claim 1, further comprising creating the behavioral biometric model by:
monitoring data streams from pointing devices operated by multiple different human users;
generating a background model that comprises a common representative behavior of all the multiple different human users; and
characterizing the pointing device data of the human user relative to the background model, to create the behavioral biometric model.

12. The method according to claim 11, wherein the characterizing of the pointing device data of the human user relative to the background model comprises:
constructing a multi-feature statistical model of the pointing device data of the human user, wherein the features are at least some of: a length of pointing device strokes, a curvature of pointing device strokes, a speed of pointing device strokes, and times of silence between pointing device strokes; and
combining the features into high-level descriptors which best separate the human user from high-level descriptors of the multiple different human users.

13. A computerized system, comprising:
at least one hardware processor;
a user interface comprising a display screen and a pointing device; and
a non-transitory computer-readable storage medium having program code embodied therewith, the program code executable by at least one hardware processor for:
receiving a behavioral biometric model that characterizes a human user according to pointing device data of the human user, wherein the pointing device data comprises screen coordinate and time stamp pairs;
monitoring an input data stream from a pointing device in real time, wherein the input data stream comprises screen coordinate and time stamp pairs and covers a plurality of spatial regions of a display screen;
segregating the input data stream into at least one subset stream that is restricted to one of the plurality of spatial regions, wherein the segregating comprises:
using multi-scale two-dimensional accumulator matrices to extract, from the input data streat: spatial clusters, and transition area between the spatial clusters,
having each screen coordinate in the input data stream vote for cells in each of the matrices, wherein the cells voted for are ones which contain the respective screen coordinate of the input data stream, and
weighting the votes using at least one of the following parameters: speed of movement through the respective screen coordinate of the input data stream, and pressure applied by the human user to the respective screen coordinate of the input data stream;
reducing a time needed for a user authorization system to verify an identity of the human user, and preventing accidental false-positive verification of the identity of the human user, by:
segregating the at least one subset stream into further subsets of overlapping time windows, and
computing a similarity score based on at least one comparison of the behavioral biometric model and each of the further subsets of overlapping time windows; and
sending the similarity score to the user authorization system, to verify the identity of the human user.

14. The computerized system according to claim 13, further comprising the steps of:
monitoring a training data stream from a pointing device of a user interface, wherein the pointing device is operated by an authorized user, and wherein the training data stream covers the plurality of spatial regions of the display screen;
computing the plurality of spatial regions using spatial cluster analysis of the screen coordinates of the training data stream;
segregating the training data stream into at least one subset training stream, each restricted to one of the plurality of spatial regions; and
computing the behavioral biometric model from the at least one subset training stream.

15. The computerized system according to claim 13, wherein the behavioral biometric model is selected from the group consisting of a path model and a pattern model, wherein the path model is a statistical model of pointing device motions between the plurality of spatial regions, and wherein the pattern model is a statistical model of pointing device motions within the plurality of spatial regions.

16. The computerized system according to claim 13, wherein the pointing device data further comprises at least one from the group consisting of a mouse button transition a mouse button state, a combined keyboard and mouse button state, and a difference in timestamp values greater than a threshold.

17. The computerized system according to claim 13, wherein the program code is further executable to perform at least one action from the group consisting of sending a notification, activating an alarm, and sending a login request.

18. The computerized system according to claim 13, wherein the program code is further executable to perform the action of computing a confidence score based on a statistical power of the similarity score and the comparison of the behavioral biometric model and the at least one subset stream.

19. A computerized system, comprising:
at least one hardware processor;
a user interface comprising a display screen and a pointing device; and a non-transitory computer-readable storage medium having program code embodied therewith, the program code executable by at least one hardware processor for:
  receiving a behavioral biometric model that characterizes a human user according to pointing device data of the human user, wherein the pointing device data comprises screen coordinate and time stamp pairs;
  monitoring an input data stream from a pointing device in real time, wherein the input data stream comprises screen coordinate and time stamp pairs and covers a plurality of spatial regions of a display screen;
  segregating the input data stream into at least one subset stream that is restricted to one of the plurality of spatial regions, wherein the segregating comprises finding an optimal number (G) of spatial clusters to extract from the input data stream, by: (i) fitting a mixture of density functions to the input data stream using maximum likelihood estimation, and (ii) classifying each potential value of G by hierarchical agglomeration that approximately maximizes a classification likelihood, starting with each data point in a singleton cluster and successively merging pairs of spatial clusters that maximize an increase in classification likelihood, until only G clusters are left;
  reducing a time needed for a user authorization system to verify an identity of the human user, and preventing accidental false-positive verification of the identity of the human user, by:
    segregating the at least one subset stream into further subsets of overlapping time windows, and
    computing a similarity score based on at least one comparison of the behavioral biometric model and each of the further subsets of overlapping time windows; and
  sending the similarity score to the user authorization system, to verify the identity of the human user.

20. The computerized system according to claim 19, further comprising the steps of:
  monitoring a training data stream from a pointing device of a user interface, wherein the pointing device is operated by an authorized user, and wherein the training data stream covers the plurality of spatial regions of the display screen;
  computing the plurality of spatial regions using spatial cluster analysis of the screen coordinates of the training data stream;
  segregating the training data stream into at least one subset training stream, each restricted to one of the plurality of spatial regions; and
  computing the behavioral biometric model from the at least one subset training stream.

21. The computerized system according to claim 19, wherein the behavioral biometric model is selected from the group consisting of a path model and a pattern model, wherein the path model is a statistical model of pointing device motions between the plurality of spatial regions, and wherein the pattern model is a statistical model of pointing device motions within the plurality of spatial regions.

22. The computerized system according to claim 19, wherein the pointing device data further comprises at least one from the group consisting of a mouse button transition a mouse button state, a combined keyboard and mouse button state, and a difference in timestamp values greater than a threshold.

23. The computerized system according to claim 19, wherein the program code is further executable to perform at least one action from the group consisting of sending a notification, activating an alarm, and sending a login request.

24. The computerized system according to claim 19, wherein the program code is further executable to perform the action of computing a confidence score based on a statistical power of the similarity score and the comparison of the behavioral biometric model and the at least one subset stream.

25. The computerized system according to claim 19, wherein the program code is further executable to estimate and maximize the mixture of density functions by:
  applying an Expectation-Maximization (EM) algorithm using an initial classification result from the hierarchical agglomeration.

26. The computerized system according to claim 19, wherein the program code is further executable to create the behavioral biometric model by:
  monitoring data streams from pointing devices operated by multiple different human users;
  generating a background model that comprises a common representative behavior of all the multiple different human users; and
  characterizing the pointing device data of the human user relative to the background model, to create the behavioral biometric model.

27. The computerized system according to claim 26, wherein the characterizing of the pointing device data of the human user relative to the background model comprises:
  constructing a multi-feature statistical model of the pointing device data of the human user, wherein the features are at least some of: a length of pointing device strokes, a curvature of pointing device strokes, a speed of pointing device strokes, and times of silence between pointing device strokes; and
  combining the features into high-level descriptors which best separate the human user from high-level descriptors of the multiple different human users.

* * * * *